United States Patent
Kanie

(10) Patent No.: US 9,614,235 B2
(45) Date of Patent: Apr. 4, 2017

(54) FUEL CELL SYSTEM AND METHOD OF CONTROLLING THE SYSTEM

(75) Inventor: Naoki Kanie, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 630 days.

(21) Appl. No.: 10/591,026

(22) PCT Filed: Mar. 24, 2005

(86) PCT No.: PCT/JP2005/006227
§ 371 (c)(1),
(2), (4) Date: Aug. 29, 2006

(87) PCT Pub. No.: WO2005/096428
PCT Pub. Date: Oct. 13, 2005

(65) Prior Publication Data
US 2008/0096059 A1  Apr. 24, 2008

(30) Foreign Application Priority Data
Apr. 2, 2004  (JP) ................. 2004-109855

(51) Int. Cl.
*H01M 8/04* (2016.01)
*H01M 8/04089* (2016.01)
(Continued)

(52) U.S. Cl.
CPC ..... *H01M 8/04089* (2013.01); *H01M 8/0662* (2013.01); *H01M 8/04686* (2013.01)

(58) Field of Classification Search
CPC ........... H01M 8/0662; H01M 8/04089; H01M 8/04664; H01M 8/04671; H01M 8/04679;
(Continued)

(56) References Cited

U.S. PATENT DOCUMENTS 5,763,113 A   6/1998  Meltser et al.
6,342,316 B1 * 1/2002  Okamoto .......... H01M 8/04089
                                              429/424
(Continued)

FOREIGN PATENT DOCUMENTS

CA   2 485 604 A1   11/2003
DE   196 20 501 C1   6/1997
(Continued)

OTHER PUBLICATIONS

Jun. 24, 2009 Office Action issued in U.S. Appl. No. 10/576,788.

*Primary Examiner* — Stephen Yanchuk
(74) *Attorney, Agent, or Firm* — Oliff PLC

(57) ABSTRACT

A fuel cell system is provided in which the concentration increase of discharged fuel gas is inhibited even when abnormality is detected in a discharge unit. A fuel cell system in which a fuel gas discharged from a discharge unit (SV5) is diluted with an oxidizing gas (14) and discharged comprises an abnormality detection unit (205) for detecting an operation abnormality of the discharge unit (SV5), and a change unit (206, 207) for changing the supplied quantity of the oxidizing gas when an abnormality of the discharge unit (SV5) is detected, and the concentration of the diluted (14) and discharged fuel gas is changed and inhibited by changing the supplied quantity of the oxidizing gas.

16 Claims, 3 Drawing Sheets

(51) Int. Cl.
*H01M 8/0662* (2016.01)
*H01M 8/04664* (2016.01)

(58) Field of Classification Search
CPC . H01M 8/04686; H01M 8/0489; Y02E 60/50; F02D 31/22
USPC .......................................... 429/22, 429, 443
See application file for complete search history.

(56) References Cited

U.S. PATENT DOCUMENTS

| | | | |
|---|---|---|---|
| 6,864,003 B2* | 3/2005 | Ueda et al. .................. | 429/25 |
| 7,264,900 B2 | 9/2007 | Ueda et al. | |
| 2002/0022161 A1 | 2/2002 | Kurosaki et al. | |
| 2002/0094469 A1 | 7/2002 | Yoshizumi et al. | |
| 2002/0148502 A1* | 10/2002 | Fujita .................. | F17C 5/06 137/266 |
| 2003/0022031 A1* | 1/2003 | Manery ........................ | 429/7 |
| 2003/0077488 A1* | 4/2003 | Yamamoto et al. ............ | 429/17 |
| 2003/0190502 A1 | 10/2003 | Illner et al. | |
| 2004/0013919 A1* | 1/2004 | Ueda et al. .................. | 429/22 |
| 2004/0202903 A1* | 10/2004 | deVos .................. | C01B 3/065 429/421 |
| 2007/0082240 A1 | 4/2007 | Fujita | |

FOREIGN PATENT DOCUMENTS

| | | |
|---|---|---|
| DE | 697 01 432 T2 | 8/2000 |
| DE | 102 01 668 A1 | 11/2002 |
| DE | 102 49 183 A1 | 7/2003 |
| JP | A-05-340312 | 12/1993 |
| JP | A 11-185781 | 7/1999 |
| JP | A 11-288731 | 10/1999 |
| JP | A-2000-255499 | 9/2000 |
| JP | A 2002-042839 | 2/2002 |
| JP | A-2002-289237 | 10/2002 |
| JP | A 2003-092125 | 3/2003 |
| JP | A 2003-132915 | 5/2003 |
| JP | A 2003-173810 | 6/2003 |
| JP | A-2004-127750 | 4/2004 |
| JP | A 2004-319332 | 11/2004 |
| WO | WO 97/44844 | 11/1997 |
| WO | WO 02/27848 A2 | 4/2002 |

* cited by examiner

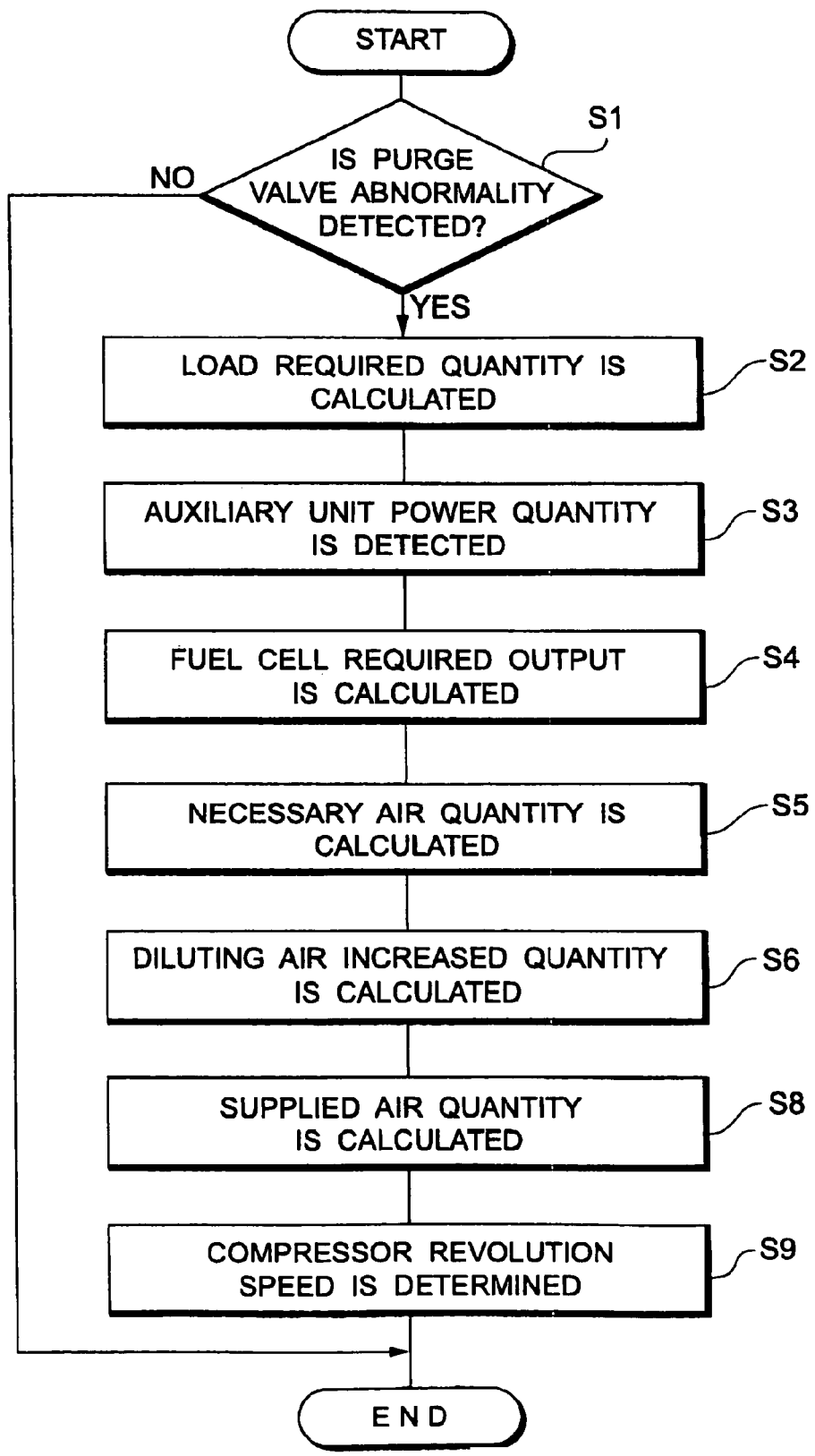

FUEL CELL SYSTEM AND METHOD OF CONTROLLING THE SYSTEM

BACKGROUND

The present invention relates to a fuel cell system equipped with a purge valve, and more particularly to a technology employed when an abnormality of the purge valve is detected.

In a system using a fuel cell, nitrogen contained in air or water that was generated by the electrochemical reaction accumulates as an impurity in a system for supplying a fuel gas to fuel electrodes. For this reason, purging is periodically conducted by discharging hydrogen gas. As a technology for detecting abnormality in a hydrogen purging valve, which is used for such purging, for example, Japanese Patent Application Laid-open No. 2003-92125 discloses a fuel cell control apparatus comprising a hydrogen purge command detection unit for detecting whether a purge command of the hydrogen purge valve is present and a trouble determination unit for determining an open-type trouble and a closed-type trouble of the hydrogen purge valve by comparing the target pressure value of the anode and the actual value. For example, when the trouble determination unit detects an open-type trouble, that is, that the hydrogen purge valve is not closed despite the fact that no purge command was issued, hydrogen is prevented from being discharged from the hydrogen purge valve to the outside by setting the ON/OFF control valve to OFF and shutting down the flow in a hydrogen circulation channel.

SUMMARY

However, the problem associated with the conventional technology is that hydrogen gas is discharged to the outside till the supply of hydrogen gas is stopped. Providing another valve downstream of the purge valve in order to prevent such discharge complicates the structure and control and is cost inefficient.

Accordingly, it is an object of the present invention to provide a fuel cell system in which the concentration increase of discharged fuel gas is inhibited even when abnormality is detected in the discharge means.

In order to resolve this problem, the present invention provides a fuel cell system in which a fuel gas from a fuel cell is discharged from discharge means, diluted with an oxidizing gas, and discharged, this fuel cell system comprising abnormality detection means for detecting an operation abnormality of the discharge means and change means for changing the supplied quantity of the oxidizing gas when an abnormality of the discharge means is detected.

With this configuration, the change means operates to change the supplied quantity of the oxidizing gas when the abnormality detection means detects an operation abnormality of the discharge means. Because the fuel gas discharged with this system is diluted with the oxidizing gas, the concentration of the fuel gas that is diluted and discharged can be changed and controlled by changing the supplied quantity of the oxidizing gas.

Here, the "discharge means" is, for example, a shut-off or control valve for purging, but those examples are not limiting. In addition to changing between two states of the valve; closed and open, the flow rate can be changed in any way.

The abnormality detection means preferably detects that the discharged quantity of the fuel gas becomes larger than a predetermined quantity due to operation failure of the discharge means. Such preference can be explained as follows. Because the concentration of the discharged fuel gas readily increases when the discharged quantity of the fuel gas is larger than the predetermined quantity, it is preferred that the increase in the discharged gas concentration in such a case be inhibited.

Furthermore, the change means preferably increases the supplied quantity of the oxidizing gas when the operation abnormality is detected. With such a configuration, when the operation abnormality of the discharge means is detected and the supplied quantity of the fuel gas increases, the supplied quantity of the oxidizing gas is also increased. With such a measure, because the quantity of the oxidizing gas for diluting the fuel gas present in a large quantity exceeding the predetermined quantity also increases, the concentration of fuel gas after diluting can be reduced.

The present system is preferably configured so that the back pressure of the discharge means changes correspondingly to the supplied quantity of the oxidizing gas. With such a configuration, the change in the supplied quantity of the oxidizing gas directly becomes the change in the back pressure of the discharge means. If the supplied quantity of the oxidizing gas increases when the discharged quantity of the fuel gas becomes larger than the predetermined quantity due to operation failure of the discharge means, not only the quantity of the oxidizing gas that will be used for dilution is increased, but the flow rate of the fuel gas passing through the discharge means can be limited and the quantity of the fuel gas discharged by the operation failure can be effectively suppressed.

Here, the aforementioned increased quantity of the oxidizing gas is preferably the quantity that can inhibit the occurrence of an abnormal oxidation reaction after the fuel gas is diluted with the oxidizing gas. This is because from the standpoint of the system it is preferred that fuel gas be diluted to a degree at which no oxidation reaction occurs.

Furthermore, the configuration of the present invention is such that the back pressure of the discharge means rises correspondingly to the increase in the supplied quantity of the oxidizing gas. For example, diluting means is provided such that the fuel off-gas discharged from the discharge means is diluted with the oxidizing off-gas discharged from the fuel cell. Because the pressure of the diluting means rises if the supplied quantity of the oxidizing gas increases, the back pressure of the discharge means connected thereto also rises.

More specifically, the fuel cell system in accordance with the present invention comprises a purge valve for discharging a fuel gas from a fuel cell as a fuel off-gas, a diluting device for diluting the fuel off-gas discharged from the purge valve with an oxidizing off-gas from the fuel cell, means for determining the required output quantity of the fuel cell, oxidizing gas supply means for supplying the oxidizing gas to the fuel cell in a supply quantity corresponding to the required output quantity, abnormality detection means for detecting an operation abnormality of the purge valve, and oxidizing gas supply increase means for increasing the supplied quantity of the oxidizing gas when an abnormality of the purge valve is detected.

The system may also additionally comprise means for determining the load required quantity of the fuel cell system, means for determining an auxiliary unit power quantity of the fuel cell system, and means for determining the required output quantity based on the determined load required quantity and the auxiliary unit power quantity.

The present invention also provides a method for controlling a fuel cell system, comprising the steps of detecting an operation abnormality of the discharge means and changing the supplied quantity of the oxidizing gas when an abnormality of the discharge means is detected.

BRIEF DESCRIPTION OF DRAWINGS

FIG. 3 is a flowchart illustrating the operation of the present embodiment.

DETAILED DESCRIPTION

The preferred mode for carrying out the invention will be described below with reference to the appended drawings. The below described embodiment illustrates only one mode of the present invention, and the present invention can be employed, without being limited to this embodiment. In the present embodiment, the method of the present invention is employed in a fuel cell system carried on a moving object such as an electric automobile.

Figure 1:
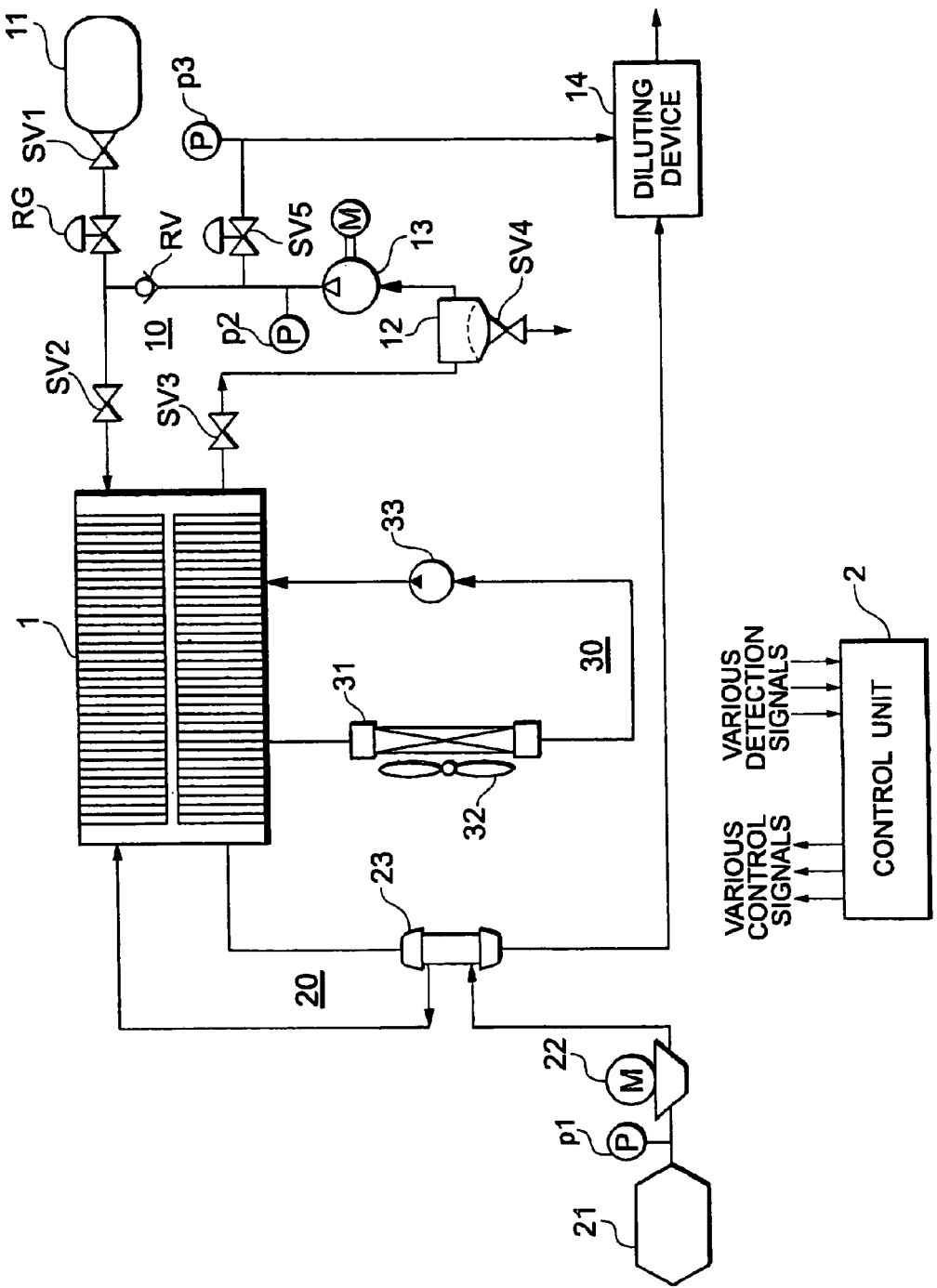
FIG. 1 is a system diagram of the fuel cell system of the present embodiment.

FIG. 1 is a full system diagram of the fuel cell system. As shown in FIG. 1, the fuel cell system comprises a fuel gas system 10 for supplying hydrogen gas serving as a fuel gas to a fuel cell stack 1, an oxidizing gas system 20 for supplying air as an oxidizing gas, and a cooling system 30 for cooling the fuel cell stack 10.

The fuel cell stack 1 has a stack structure comprising a stack of a plurality of cells, each cell comprising a separator having channels for the hydrogen gas, air, and cooling liquid and a MEA (Membrane Electrode Assembly) sandwiched between a pair of separators. The MEA has a structure in which a polymer electrolyte membrane is sandwiched between two electrodes: a fuel electrode and an air electrode. In the fuel electrode, a catalyst layer for the fuel electrode is provided on a porous support layer, and in the air electrode, a catalyst layer for the air electrode is provided on a porous support layer. In order to induce a reverse reaction of water electrolysis in the fuel cell, the hydrogen gas, which is a fuel gas, is supplied to the fuel electrode side, which is an anode (negative electrode), the oxidizing gas (air) is supplied to the air electrode side, which is a cathode (positive electrode), a reaction represented by Formula (1) is induced at the fuel electrode side, a reaction represented by Formula (2) is induced at the air electrode side, electrons are caused to circulate, and an electric current flows.

$$H_2 \rightarrow 2H^+ + 2e^- \quad (1)$$

$$2H^+ + 2e^- + (1/2)O_2 \rightarrow H_2O \quad (2)$$

The fuel gas system 10 comprises a hydrogen tank 11 as a hydrogen gas supply source, a source valve SV1, a pressure regulating valve RG, a fuel cell inlet shut-off valve SV2, a fuel cell outlet shut-off valve SV3 via the fuel cell stack 10, a gas-liquid separator 12, a shut-off valve SV4, a hydrogen pump 13, and a check valve RV.

The hydrogen tank 11 is filled with high-pressure hydrogen gas. A variety of tanks such as a hydrogen tank using a hydrogen-storage alloy, a hydrogen supply mechanism based of a reforming gas, a liquid hydrogen tank, or a liquefied fuel tank can be used instead of the high-pressure hydrogen tank. The source valve SV1 controls the supply of hydrogen gas. The pressure regulating valve RG regulates the pressure in the downstream circulation path. The fuel cell inlet shut-off valve SV2 and outlet shut-of valve SV3 are closed, for example, when power generation in the fuel cell is stopped. The gas-liquid separator 12 removes moisture that is generated by the electrochemical reaction in the fuel cell stack 10 during usual operations and other impurities from the hydrogen off-gas and releases them to the outside via the shut-off valve SV4. The hydrogen pump 13 forces the hydrogen gas present in the circulation path to circulate based on the control signal of the control unit 2.

The discharge path is branched before the check valve RV, and a purge valve SV5, which corresponds to the discharge means of the present invention, is provided on the discharge path. A pressure sensor p2 for measuring the pressure of the hydrogen off-gas is provided on the primary side (upstream side) of the purge valve SV5, and a pressure sensor p3 for measuring the pressure of the hydrogen off-gas is provided on the secondary side (downstream side) of the purge valve SV5.

The oxidizing gas system 20 comprises an air cleaner 21, a compressor 22, and a humidifier 23. The air cleaner 21 purifies the external air and introduces it into the fuel cell system. The compressor 22 changes the quantity or pressure of the air supplied to the fuel cell stack 1 by compressing the introduced air based on the control signal of the control unit 2. The humidifier 23 appropriately increases the moisture content by conducting exchange with moisture between the compressed air and cathode (air) off-gas. A pressure sensor p1 is provided in the vicinity of the air inlet opening of the air cleaner 21, enabling the detection of the external air pressure (atmospheric pressure).

The air off-gas discharged from the fuel cell stack 1 is supplied to a diluting device 14 and mixed with the hydrogen off-gas discharged from the purge valve SV5. Thus, if the concentration of the hydrogen off-gas is high, an intensive oxidizing action is readily induced. Therefore, such an abnormal state is prevented by diluting the hydrogen off-gas with the air off-gas. As a result, the hydrogen off-gas and air off-gas assume a pressure close to the atmospheric pressure and the difference in pressure between the two is not large.

The present fuel cell system is constructed so that the back pressure of the purge valve SV5 changes correspondingly to the supplied air quantity. Thus, in the above-described system, if the revolution speed of the compressor 22 of the air system 20 changes, the change in the supply pressure of air resulting from this change in revolution speed reaches the diluting device 14. Because the diluting device 14 is necessary to dilute the hydrogen off-gas and air off-gas, it has a structure such that the change in the pressure of one gas leads to the change in the pressure of the other gas. Thus, the structure is such that, for example, if the supply pressure of the air system 20 rises, the back pressure of the purge valve SV5 also rises via the diluting device 14.

Figure 2:
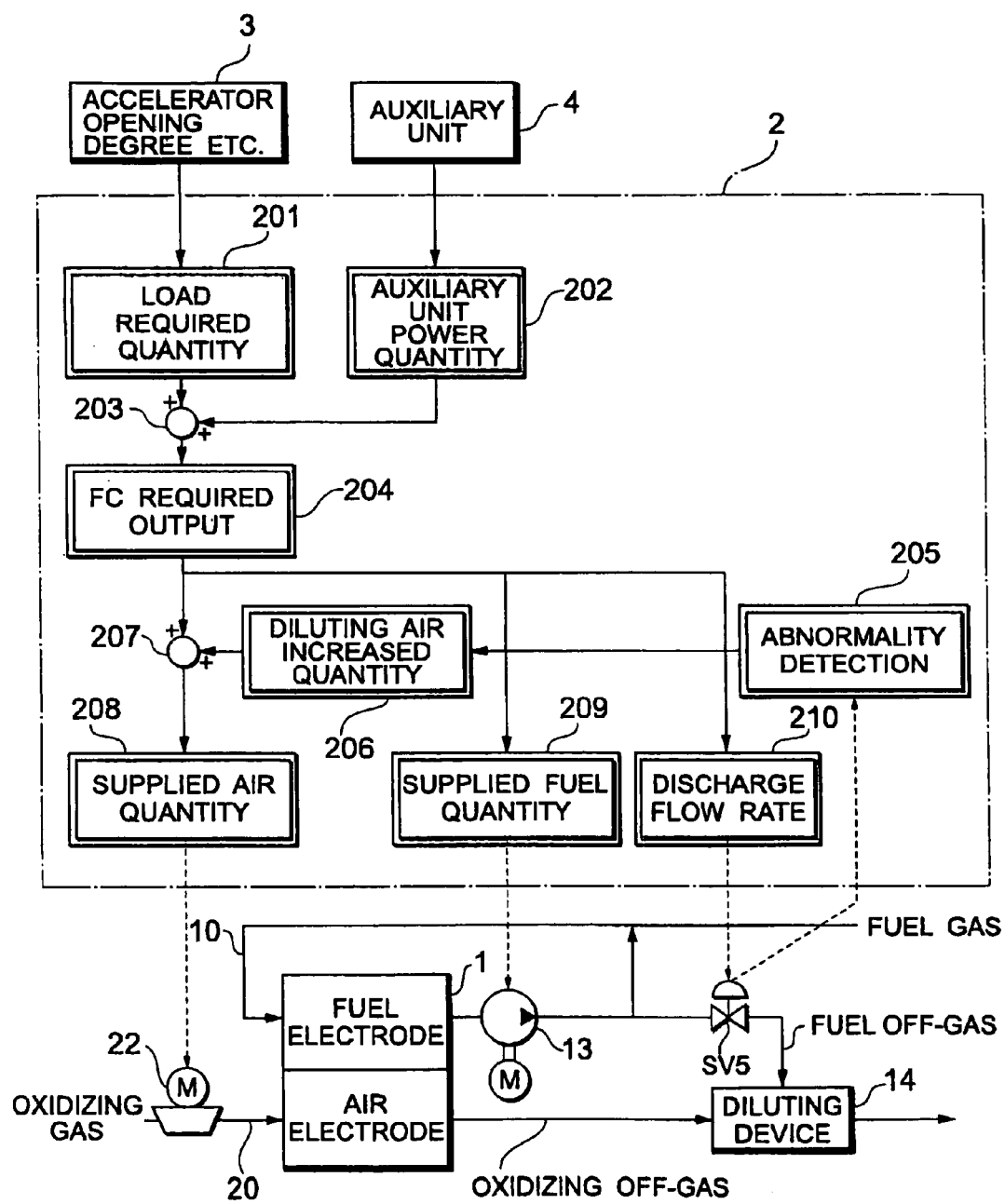
FIG. 2 is a functional block diagram of the fuel cell system of the present embodiment.

The control unit 2 is a well-known computer system such as an ECU (Electric Control Unit), wherein a CPU (central processing unit), which is not shown in the figure, successively executes a software program stored in a ROM or the like (not shown in the figure), thereby making it possible to realize a functional block shown in FIG. 2. In the control unit 2, a large number of various functions including the method of the present invention are realized by a joint action of functions realized by a plurality of microprocessors executing respective different program modules, rather than by using a single microprocessor.

Furthermore, the cooling system 30 of the fuel cell stack 1 comprises a radiator 31, a fan 32, and a cooling pump 33 and supplies a liquid coolant so that it circulates inside the fuel cell stack 1.

FIG. 2 is a functional block of the fuel cell system of the present invention. FIG. 2 shows the relationship between the section of the structure shown in FIG. 1 that makes contribution to the present invention and functional blocks obtained by dividing the control unit 2 into blocks based on functions thereof.

As shown in FIG. 2, from the standpoint of functions, the control unit 2 comprises load required quantity calculation means 201, auxiliary unit power quantity detection means 202, addition means 203, fuel cell required output calculation means 204, purge valve trouble detection means 205, diluting air increase quantity calculation means 206, addition means 207, supplied air quantity calculation means 208, supplied fuel quantity calculation means 209, and discharge flow rate calculation means 210.

In particular, the specific feature of the present fuel cell system is in that the increased quantity of air calculated by the diluting air increase quantity calculation means 206 when the abnormality detection means 205 detected the abnormal operation of the purge valve SV5 is added to and changes the original air necessary quantity calculated by the fuel cell required output calculation means 204 in the addition means 207.

FIG. 3 shows a flowchart illustrating the operations in accordance with the present invention implemented in the control unit 2. This processing module is executed periodically or aperiodically during operation of the fuel cell system. The processing order is merely an example, and the order of operations may be changed, provided that the object of the present invention is attained.

First, whether or not an abnormality was detected in the purge valve SV5 in accordance with the present invention is investigated (S1). Well-known technology, for example, such as described in Japanese Patent Application Laid-open No. 2003-92125 can be employed as a method for detecting an abnormality in the purge valve SV5.

For example, whether or not the control unit 2 outputted a valve close control signal to the purge valve SV5 is detected based on the results of discharge flow rate calculation (210), and the detection signal of the pressure sensor p2 or p3 is referred to when the valve close control signal was outputted. If the purge valve SV5 is closed in accordance with the control signal, the primary side pressure sensor p2 disposed in the circulation path of the hydrogen gas system 10 has to indicate a pressure corresponding to the target pressure of the hydrogen gas determined from the required output of the fuel cell stack 1. When the pressure detected with the pressure sensor p2 is lower than this target pressure, hydrogen gas can be assumed to flow out of the purge valve SV5 and an abnormality can be determined.

Furthermore, if the purge valve SV5 is closed in accordance with the control signal, the secondary side pressure sensor p3 disposed on the downstream side of the purge valve SV5 has to indicate the atmospheric pressure substantially identical to the supplied pressure of the air system 20. Thus, the pressure detected by the pressure sensor p3 has to be almost equal to the pressure measured with the pressure sensor p1 which measures the atmospheric pressure. When the pressure detected by the pressure sensor p3 is higher than the atmospheric pressure detected by the pressure sensor p1, a decision can be made that the hydrogen gas leaks.

Furthermore, when the difference between the pressure detected by the primary side pressure sensor p2 and the pressure detected by the secondary side pressure sensor p3 is less than the prescribed value, the hydrogen off-gas apparently flows through the purge valve SV5. Therefore, the purge valve SV5 can be detected to be in an abnormal state.

Whether the purge valve SV5 is in an abnormal state is determined by any detection method (S1: 205); if no abnormality was detected (NO), the processing flow advances to the next processing operation, and if an abnormality was detected (YES), the processing flow advances to the air quantity change processing (S2 to S9) in accordance with the present invention.

First, the control unit 2 calculates the load required quantity by referring to the detected signal of accelerator opening 3, etc. (S2; 201). The load required quantity can be determined as a torque quantity that has to be outputted by the drive motor of the moving object with reference to an accelerator opening detection signal that is obtained by detecting the movement of acceleration pedal, a shift lever position detection signal, or a brake operation detection signal.

Then, the control unit 2 detects the auxiliary unit power quantity, e.g., of a compressor or a pump, for operating the fuel cell system (S3; 202). The electric current quantity supplied to each auxiliary unit may be directly detected and used as the auxiliary unit power quantity, but roughly estimated quantity for which the correspondent relationship was determined in advance and which is roughly established from the operation state of the system may be also used.

Then, the control unit 2 adds up the load required quantity and auxiliary unit power quantity (203) and calculates the required output quantity that is desired to be generated in the fuel cell stack 1 (S4: 204).

The control unit 2 then calculated the additional necessary quantity of air that is considered to be necessary when an abnormality has occurred in the purge valve SV5 and the valve is not open despite the valve opening command (S6: 206). This air increase quantity can be set based on various approaches. For simplicity, it can be taken as a maximum air quantity that can be supplied in this fuel cell system, that is, the quantity obtained when the compressor 22 operates at a maximum revolution speed. Furthermore, based on the flow rate of the hydrogen off-gas flowing out when the purge valve SV5 is not closed, the air quantity necessary to dilute the hydrogen off-gas with this flow rate can be reverse calculated till a value is obtained at which the abnormal oxidation reaction does not occur. This is because, if the hydrogen off-gas is at a concentration below a constant concentration, the abnormal oxidation reaction does not occur.

The control unit 2 determines the air increase quantity for diluting the hydrogen off-gas whose quantity has increased due to abnormality of the purge valve SV5, adds the usual air quantity that is necessarily set from the required output quantity of the fuel cell (207), and calculates the supplied air quantity which is wished to be supplied from the compressor 22 (S8: 208). Then, the control unit 2 finds the revolution speed (drive quantity) of the compressor 22 necessary to supply this supplied air quantity and outputs a control signal for driving at this revolution speed to the compressor 22 (S9). If the revolution speed of the compressor 22 increases, the quantity of air supplied to the diluting device 14 increases, and the concentration of the hydrogen off-gas that leaked out is reduced.

Parallel with the above-described air quantity change processing, the control unit 2 may output a control signal to close the shut-off valves SV1 to SV3 or output a control signal for reducing the revolution speed of the hydrogen pump 13 or stopping the pump, thereby conducting processing that reduces or terminates the supply of hydrogen gas.

With the present embodiment, the series of the above-described operations results in an increased supply of air capable of diluting the hydrogen off-gas whose amount increased due to the abnormality of the purge valve SV5 despite the fact that this abnormality was detected. Therefore, the operation of the system can be continued, though the abnormality of the purge valve has occurred.

Another merit of the above-described processing is that if the amount of air is increased, it acts to reduce the quantity of hydrogen off-gas that leaks out due to the abnormality of the purge valve. As described hereinabove, in the present fuel cell system, the air system 20 and the hydrogen gas system 10 can be pressure linked to each other via the diluting device 14. If the air pressure supplied from the compressor 22 increases due to the above-described processing, the back pressure (pressure on the secondary side) of the purge valve SV5 also rises following this increase in the air pressure. The flow rate of gas passing through a valve generally increases with the difference between the pressure on the primary side and pressure on the secondary side. With the present embodiment, the difference in pressure between the primary side and secondary side decreases because the backpressure of the purge valve SV5 rises, and the amount of the hydrogen off-gas that flows out can be reduced even without changes in the opening degree of the purge valve itself.

Other Embodiments

The present invention is not limited to the above-described embodiments and various modifications thereof can be used. For example, the fuel cell system was used in a system of a type such that the circulation path of the hydrogen gas system 10 was connected to the upstream side of the pressure regulating valve RV, but the present invention can be also directly employed in a fuel cell system in which the circulation path is connected to the downstream side of the pressure regulating valve RV.

Furthermore, the method for detecting the abnormality of the purge valve SV5 is not limited to that described above, and the purge valve abnormality can be detected by a variety of methods. For example, the estimated value of the pressure of the purge valve can be compared with the actually measured value, or the hydrogen gas concentration may be directly detected to detect whether the purge valve is reliably closed correspondingly to the level of concentration.

Furthermore, a method other than the compressor drive method may be used for increasing the quantity of air. For example, a configuration may be used in which a gas employed for diluting is supplied (it does not matter whether or not it is an oxidizing gas) and mixed with the fuel off-gas, independently of air (oxidizing gas) supplied to the fuel cell, instead of increasing the quantity of the air (oxidizing gas) off-gas from the fuel cell. More specifically, a configuration may be used which comprises a gas tank for diluting and in which the fuel off-gas is diluted by supplying gas for diluting from this gas tank when a purge valve abnormality occurs.

As described hereinabove, with the present invention, the supplied quantity of oxidizing gas is changed when the operation abnormality of discharge means is detected. Therefore, the concentration of the fuel gas discharged after diluting can be changed and decreased.

Therefore, the present invention is generally applicable to fuel cell systems with a structure in which the fuel off gas (purged hydrogen gas) is diluted with the oxidizing off-gas (air). Such a fuel cell system can be used on objects that move on the ground, such as vehicles, move on the water, such as ships, move under the water, such as submarines, and move in the air, such as aircrafts, or on immovable objects such as power generating plants.

I claim:

1. A fuel cell system comprising:
a fuel gas tank for supplying a fuel cell with fuel gas;
a purge valve for purging fuel gas from a fuel gas electrode of the fuel cell;
a diluting device for diluting the fuel gas discharged from the purge valve with an oxidizing gas, wherein the diluting device is connected to the purge valve, and the diluting device is configured to discharge the fuel gas discharged by the purge valve after dilution with the oxidizing gas;
a pressure sensor that detects pressure of the fuel gas upstream of the purge valve, downstream of the purge valve or both upstream and downstream of the purge valve; and
an electronic control unit with control logic, which is programmed to:
determine a required output quantity of the fuel cell;
supply the oxidizing gas to the fuel cell in a supply quantity corresponding to the required output quantity;
detect an operation abnormality of the purge valve in which the purge valve fails to open despite a valve opening command when the pressure of the fuel gas detected by the pressure sensor is different from that of expected pressure when the purge valve is operating normally; and
change the supplied quantity of said oxidizing gas when the operation abnormality of the purge valve is detected,
wherein when the operation abnormality of the purge valve is detected, the electronic control unit is programmed to change a quantity of the oxidizing gas to be larger than the supplied quantity corresponding to the required output quantity and to supply the changed quantity of the oxidizing gas to the fuel cell.

2. The fuel cell system according to claim 1, wherein the increased quantity of said oxidizing gas is a quantity that can inhibit the occurrence of an abnormal oxidation reaction after the fuel gas is diluted with the oxidizing gas.

3. The fuel cell system according to claim 1, wherein the back pressure of the purge valve changes according to the supplied quantity of said oxidizing gas.

4. The fuel cell system according to claim 3, wherein the back pressure of the purge valve rises with the increase in the supplied quantity of said oxidizing gas.

5. A fuel cell system comprising:
a fuel gas tank for supplying a fuel cell with fuel gas;
a purge valve for discharging the fuel gas from the fuel cell as a fuel off-gas;
a diluting device for diluting said fuel off-gas discharged from said purge valve with an oxidizing off-gas from said fuel cell, wherein the diluting device is connected to the purge valve, and the diluting device is configured to discharge the fuel gas discharged by the purge valve after dilution with the oxidizing off-gas;
a pressure sensor that detects pressure of the fuel gas upstream of the purge valve, downstream of the purge valve or both upstream and downstream of the purge valve; and
an electronic control unit with control logic, which is programmed to:

determine the required output quantity of said fuel cell;
supply the oxidizing gas to said fuel cell in a supply quantity corresponding to said required output quantity;
detect an operation abnormality of said purge valve in which the purge valve fails to open despite a valve opening command when the pressure of the fuel gas detected by the pressure sensor is different from that of expected pressure when the purge valve is operating normally; and
change the supplied quantity of the oxidizing gas when the operation abnormality of the purge valve is detected,
wherein when the operation abnormality of the purge valve is detected, the electronic control unit is programmed to change a quantity of the oxidizing gas to be larger than the supplied quantity corresponding to the required output quantity and to supply the changed quantity of the oxidizing gas to the fuel cell.

6. The fuel cell system according to claim 5, wherein the electronic control unit includes further control logic, which is programmed to:
determine a load required quantity of said fuel cell system;
determine an auxiliary unit power quantity of said fuel cell system; and
determine said required output quantity based on said determined load required quantity and said auxiliary unit power quantity.

7. A method for controlling a fuel cell system in which a fuel gas from a fuel cell is discharged from a purge valve, diluted with an oxidizing gas, and discharged, comprising the steps of:
determining, via an electronic control unite, a required output quantity of the fuel cell;
supplying, via the electronic control unit, the oxidizing gas to the fuel cell in a supply quantity corresponding to the required output quantity;
detecting, via the electronic control unit, an operation abnormality of the purge valve in which the purge valve fails to open despite a valve opening command when pressure of the fuel gas upstream of the purge valve, downstream of the purge valve or both upstream and downstream of the purge valve detected by a pressure sensor is different from that of expected pressure when the purge valve is operating normally;
changing, via the electronic control unit, the supplied quantity of the oxidizing gas to be larger than the supplied quantity corresponding to the required output quantity when the operation abnormality of said discharge means is detected; and
supplying, via the electronic control unit, the changed quantity of the oxidizing gas to the fuel cell when the operation abnormality of the purge valve is detected.

8. The fuel cell system according to claim 1, wherein
the pressure sensor detects pressure of the fuel gas upstream of the purge valve, and
the electronic control unit detects the operation abnormality of the purge valve when the pressure of the fuel gas detected by the pressure sensor is less than a target pressure when the purge valve is closed.

9. The fuel cell system according to claim 1, further comprising:
a second pressure sensor that detects atmospheric pressure, wherein
the pressure sensor detects pressure of the fuel gas downstream of the purge valve, and
the electronic control unit detects the operation abnormality of the purge valve when the pressure of the fuel gas detected by the pressure sensor is higher than the atmospheric pressure detected by the second pressure sensor when the purge valve is closed.

10. The fuel cell system according to claim 1, wherein
the pressure sensor detects pressure of the fuel gas both upstream and downstream of the purge valve, and
the electronic control unit detects the operation abnormality of the purge valve when a difference between the pressure detected upstream of the purge valve and the pressure detected downstream of the purge valve is less than a predetermined value when the purge valve is closed.

11. The fuel cell system according to claim 5, wherein
the pressure sensor detects pressure of the fuel gas upstream of the purge valve, and
the electronic control unit detects the operation abnormality of the purge valve when the pressure of the fuel gas detected by the pressure sensor is less than a target pressure when the purge valve is closed.

12. The fuel cell system according to claim 5, further comprising:
a second pressure sensor that detects atmospheric pressure, wherein
the pressure sensor detects pressure of the fuel gas downstream of the purge valve, and
the electronic control unit detects the operation abnormality of the purge valve when the pressure of the fuel gas detected by the pressure sensor is higher than the atmospheric pressure detected by the second pressure sensor when the purge valve is closed.

13. The fuel cell system according to claim 5, wherein
the pressure sensor detects pressure of the fuel gas both upstream and downstream of the purge valve, and
the electronic control unit detects the operation abnormality of the purge valve when a difference between the pressure detected upstream of the purge valve and the pressure detected downstream of the purge valve is less than a predetermined value when the purge valve is closed.

14. The method according to claim 7, wherein
the pressure of the fuel gas upstream of the purge valve is detected by the pressure sensor, and
the operation abnormality of the purge valve is detected when the pressure of the fuel gas detected by the pressure sensor is less than a target pressure when the purge valve is closed.

15. The method according to claim 7, further comprising:
detecting, via the electronic control unit, atmospheric pressure with a second pressure sensor, wherein
the pressure of the fuel gas downstream of the purge valve is detected by the pressure sensor, and
the operation abnormality of the purge valve is detected when the pressure of the fuel gas detected by the pressure sensor is higher than the atmospheric pressure detected by the second pressure sensor when the purge valve is closed.

16. The method according to claim 7, wherein
the pressure of the fuel gas both upstream and downstream of the purge valve is detected by the pressure sensor, and
the operation abnormality of the purge valve is detected when a difference between the pressure detected upstream of the purge valve and the pressure detected downstream of the purge valve is less than a predetermined value when the purge valve is closed.

* * * * *